(12) United States Patent
Kawasaki

(10) Patent No.: US 10,029,317 B2
(45) Date of Patent: Jul. 24, 2018

(54) CUTTING INSERT AND CUTTING EDGE REPLACEABLE ROTARY CUTTING TOOL

(71) Applicant: TUNGALOY CORPORATION, Iwaki-shi, Fukushima (JP)

(72) Inventor: Sozo Kawasaki, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 379 days.

(21) Appl. No.: 14/429,656

(22) PCT Filed: Sep. 20, 2013

(86) PCT No.: PCT/JP2013/075566
§ 371 (c)(1),
(2) Date: Mar. 19, 2015

(87) PCT Pub. No.: WO2014/046260
PCT Pub. Date: Mar. 27, 2014

(65) Prior Publication Data
US 2015/0246398 A1  Sep. 3, 2015

(30) Foreign Application Priority Data

Sep. 20, 2012 (JP) ................................. 2012-207597

(51) Int. Cl.
*B23B 51/04* (2006.01)
*B23B 27/14* (2006.01)

(52) U.S. Cl.
CPC .......... *B23B 51/048* (2013.01); *B23B 27/141* (2013.01); *B23B 2200/0409* (2013.01);
(Continued)

(58) Field of Classification Search
CPC ................ B23B 51/048; B23B 27/141; B23B 2200/323; B23B 2222/80; B23B 2200/87;
(Continued)

(56) References Cited

U.S. PATENT DOCUMENTS 4,035,888 A * 7/1977 Romagnolo .......... B23B 27/143
  407/114
6,979,153 B1 * 12/2005 Shiraiwa ............... B23B 27/045
  407/107

(Continued)

FOREIGN PATENT DOCUMENTS

DE  29815761 U1 * 1/2000 ........... B23B 27/141
JP  6-134611      5/1994

(Continued)

OTHER PUBLICATIONS

International Preliminary Report on Patentability (IPRP) issued in PCT counterpart application (No. PCT/JP2013/075566) with English translation.

(Continued)

*Primary Examiner* — Daniel Howell
*Assistant Examiner* — Paul M Janeski
(74) *Attorney, Agent, or Firm* — Studebaker & Brackett PC

(57) ABSTRACT

A cutting insert is used in a cutting edge replaceable rotary cutting tool. The cutting insert includes a first cutting edge formed on an intersecting ridge portion between a first end surface of two opposite end surfaces and a circumferential side surface, and a first depressed portion formed along a part of the first cutting edge. The first depressed portion is provided to form a larger rake angle at the first cutting edge than that at a part not having the first depressed portion of the first cutting edge.

18 Claims, 17 Drawing Sheets

(52) U.S. Cl.
CPC ... *B23B 2200/087* (2013.01); *B23B 2200/323* (2013.01); *B23B 2222/80* (2013.01); *B23B 2222/84* (2013.01); *Y10T 407/235* (2015.01); *Y10T 407/24* (2015.01); *Y10T 408/9098* (2015.01)

(58) Field of Classification Search
CPC ........ B23B 2222/84; B23B 2200/0409; B23B 27/143; B23B 27/1607; B23B 2200/087; B23B 2200/325; Y10T 407/24; Y10T 408/9098
See application file for complete search history.

(56) References Cited

U.S. PATENT DOCUMENTS

| | | | | |
|---|---|---|---|---|
| 2007/0041798 | A1* | 2/2007 | Nasu | B23B 27/141 407/114 |
| 2007/0071559 | A1* | 3/2007 | Koskinen | B23B 27/16 407/34 |
| 2007/0077130 | A1* | 4/2007 | Ley | B23B 27/1607 407/114 |
| 2009/0080985 | A1* | 3/2009 | Barnthaler | B23D 77/02 407/100 |
| 2010/0061821 | A1 | 3/2010 | Okumura | |
| 2010/0166514 | A1* | 7/2010 | Okumura | B23B 51/02 408/1 BD |
| 2011/0044776 | A1 | 2/2011 | Ishi | |
| 2013/0170915 | A1* | 7/2013 | Saji | B23B 27/141 407/33 |

FOREIGN PATENT DOCUMENTS

| | | |
|---|---|---|
| JP | 2001-239412 | 4/2001 |
| JP | 2001-252809 | 9/2001 |
| JP | 2008-284666 | 11/2008 |

OTHER PUBLICATIONS

International Search Report in PCT/JP2013/075566, dated Nov. 26, 2013.

* cited by examiner

CUTTING INSERT AND CUTTING EDGE REPLACEABLE ROTARY CUTTING TOOL

RELATED APPLICATIONS

This is a 371 US National Phase of International Patent Application No. PCT/JP2013/075566 filed Sep. 20, 2013, and published as WO2014/046260A1 on Mar. 27, 2014, which claims priority to JP 2012-207597, filed Sep. 20, 2012. The contents of the aforementioned application are incorporated by reference in their entirety.

TECHNICAL FIELD

The present invention relates to a cutting insert used in a cutting edge replaceable rotary cutting tool used for cutting, and to the cutting edge replaceable rotary cutting tool to which the cutting insert is detachably mounted.

BACKGROUND ART

When drilling a material to be cut which exhibits high ductility, such as stainless steel and mild steel, that is, a material with high toughness by a cutting edge replaceable drill, a long continuous chip is likely to be generated. The long chip is not preferable because of the following reasons.

The long chip is likely to be entangled with a drill body, and the chip entangled with the drill body may close the opening of a chip discharge groove (flute). If the chip discharge groove is clogged with the chip, it is difficult to continue further cutting. If the chip is further entangled with the drill body, the chip may damage a workpiece, that is, work. Therefore, if the long chip is entangled with the drill body, the processing is interrupted and an operation of removing the entangled chip is generated. Such an operation deteriorates the productivity. Furthermore, the long extended chip has a heavy weight, and accordingly such scattering of chips caused, for example, by rotation of the drill is unfavorable in a safety aspect. Additionally the long extended chip is unfavorable for the operation of the peripheral machine. For example, such chip may interrupt the operation of the conveyor, which also affects the productivity.

Patent Literature 1 discloses the tip for drill, that is, cutting insert originated to allow use in the process of cutting the mild steel and stainless steel, and having a center edge that constitutes a center portion of an end cutting edge, and a peripheral edge that constitutes the outer circumferential part of the end cutting edge. This cutting insert has a substantially parallelogram plate shape. The center edge and the peripheral edge are arranged and formed on the edge of the upper surface of the substantially parallelogram shape via the corner part. A breaker groove with the shape of concave curved surface is formed in the upper surface along the center edge and the peripheral edge. The breaker groove of the peripheral edge is larger than the breaker groove of the center edge with respect to both the length and depth in the direction orthogonal to the cutting edge. As a result, on the peripheral edge, it is intended to favorably curl the chip to suppress long extension of the chip, and on the center cutting edge, it is intended to suppress rapid increase in the cutting resistance by avoiding clogging with the chip.

CITATION LIST

Patent Literature

PTL 1: Japanese Patent No. 4475723

SUMMARY OF INVENTION

Technical Problem

The cutting edge replaceable drill having the cutting insert, for example, as disclosed in Patent literature 1 attached to the drill body is configured such that the peripheral edge and the center edge are arranged so as to substantially extend in the radial direction with respect to the rotation axis, respectively. The thus arranged cutting edges are rotated around the rotation axis so that there is a speed difference between the rotating speed of the radial inner portion of the cutting edge and the rotating speed of the radial outer portion of the cutting edge. Therefore, the processing with the cutting edge replaceable drill is likely to generate the long spirally extending chip. Particularly, in processing of the material with relatively high ductility such as stainless steel and mild steel, such a long chip is likely to be generated. In contrast, the cutting insert disclosed in Patent Literature 1 is designed based on the difference in chip processing between the center edge and the peripheral edge. There is room for improvement in discharge of the long chip resulting from such difference between the rotating speeds in the same cutting edge.

The present invention is made in view of the aforementioned circumstances, and has an object to provide the cutting insert which enables to suppress discharge of the long chip, and the cutting edge replaceable rotary cutting tool to which the cutting insert is detachably mounted.

Solution to Problem

According to a first aspect of the present invention, there is provided a cutting insert comprising two opposite end surfaces and a circumferential side surface extending between the two end surfaces, the cutting insert including: a first cutting edge formed on an intersecting ridge portion between a first end surface of the two end surfaces and the circumferential side surface; and a first depressed portion formed in the first end surface, the first depressed portion being formed along a part at one end side of the first cutting edge so as to form a larger rake angle at the first cutting edge than a rake angle at a part not having the first depressed portion of the first cutting edge.

Preferably, a first groove portion is further formed in the first end surface. In this case, the first groove portion may preferably extend along the part not having the first depressed portion of the first cutting edge. At this time, a rake angle at the first groove portion may be preferably smaller than that at the first depressed portion to which the first groove portion is connected. Further, a length of the first groove portion in a direction orthogonal to the first cutting edge may be preferably shorter than that of the first depressed portion in the direction orthogonal to the first cutting edge.

Preferably, the cutting insert is formed for a rotary cutting operation, and the first cutting edge can be disposed so as to extend substantially in a radial direction with respect to a rotation axis, and rotated around the rotation axis to be used for the cutting work. At this time, the first depressed portion may be preferably formed along a part located radially outward of the first cutting edge.

The first depressed portion may be is formed so that at least one of a depth of the first depressed portion and a length thereof in the direction orthogonal to the first cutting edge increases as it approaches the one end along the first cutting edge.

For example, a plurality of the first cutting edges may be formed on the intersecting ridge portion between the first end surface and the circumferential side surface. In this case, the plurality of first cutting edges may preferably extend rotationally symmetrically around an axis extending so as to pass through the two end surfaces. The cutting insert with the plurality of first cutting edges may preferably include a plurality of first depressed portions in the first end surface. In this case, each of the first depressed portions may be preferably formed along one end side of the related first cutting edge. The cutting insert with the plurality of first cutting edges may preferably further include a plurality of first groove portions in the first end surface. In this case, each of the first groove portions may preferably extend along the part not having the first depressed portion of the related first cutting edge. The first depressed portion and the first groove portion may be preferably associated with each other as described above.

Preferably, the cutting insert may further include a plurality of second cutting edges formed on the intersecting ridge portion between the second end surface of the two end surfaces and the circumferential side surface, extending rotationally symmetrically around the axis. In this case, a plurality of second depressed portions may be formed in the second end surface. Preferably, each of the second depressed portions may be formed along a part on one end side of the related second cutting edge and provided so as to form a rake angle at the second cutting edge larger than that at a part not having the second depressed portion of the second cutting edge.

More preferably, a plurality of second groove portions may further be formed in the second end surface. In this case, each of the second groove portions may preferably extend along the part not having the second depressed portion of the related second cutting edge. The rake angle at the second groove portion may be preferably smaller than that at the second depressed portion to which the second groove portion is connected. A length of the second groove portion in a direction orthogonal to the second cutting edge may be preferably shorter than that of the second depressed portion in the direction orthogonal to the second cutting edge.

Preferably, the cutting insert is formed for a rotary cutting operation, and the second cutting edge is disposed so as to extend substantially in a radial direction with respect to a rotation axis so as to be rotated around the rotation axis to be used for the cutting work. At this time, the second depressed portion may be preferably provided along a part located radially outward of the second cutting edge.

The second depressed portion may be formed so that at least one of a depth of the second depressed portion and a length thereof in the direction orthogonal to the second cutting edge increases as it approaches the one end along the second cutting edge.

The first cutting edge may be configured to have a different shape from that of the second cutting edge. Instead, the first cutting edge may be preferably formed to have the same shape as that of the second cutting edge.

According to a second aspect of the present invention, there is provided a cutting edge replaceable rotary cutting tool including a tool body in which a rotation axis is defined and at least one insert mounting seat is formed, and allowing a cutting insert to be detachably mounted on the insert mounting seat, wherein:

the cutting insert is configured as described above;
the cutting insert is mounted on the insert mounting seat so that an operable first cutting edge extends substantially in a radial direction with respect to the rotation axis; and
the first depressed portion is associated with a part located radially outward of the operable first cutting edge.

The tool body may further include at least one second insert mounting seat. In this case, the above-described cutting insert including the second cutting edge may be mounted on the second insert mounting seat so that an operable second cutting edge extends substantially in a radial direction with respect to the rotation axis. In the cutting insert mounted on the second insert mounting seat, the second depressed portion may be preferably associated with a part located radially outward of the operable second cutting edge.

DESCRIPTION OF EMBODIMENTS

Figure 1:
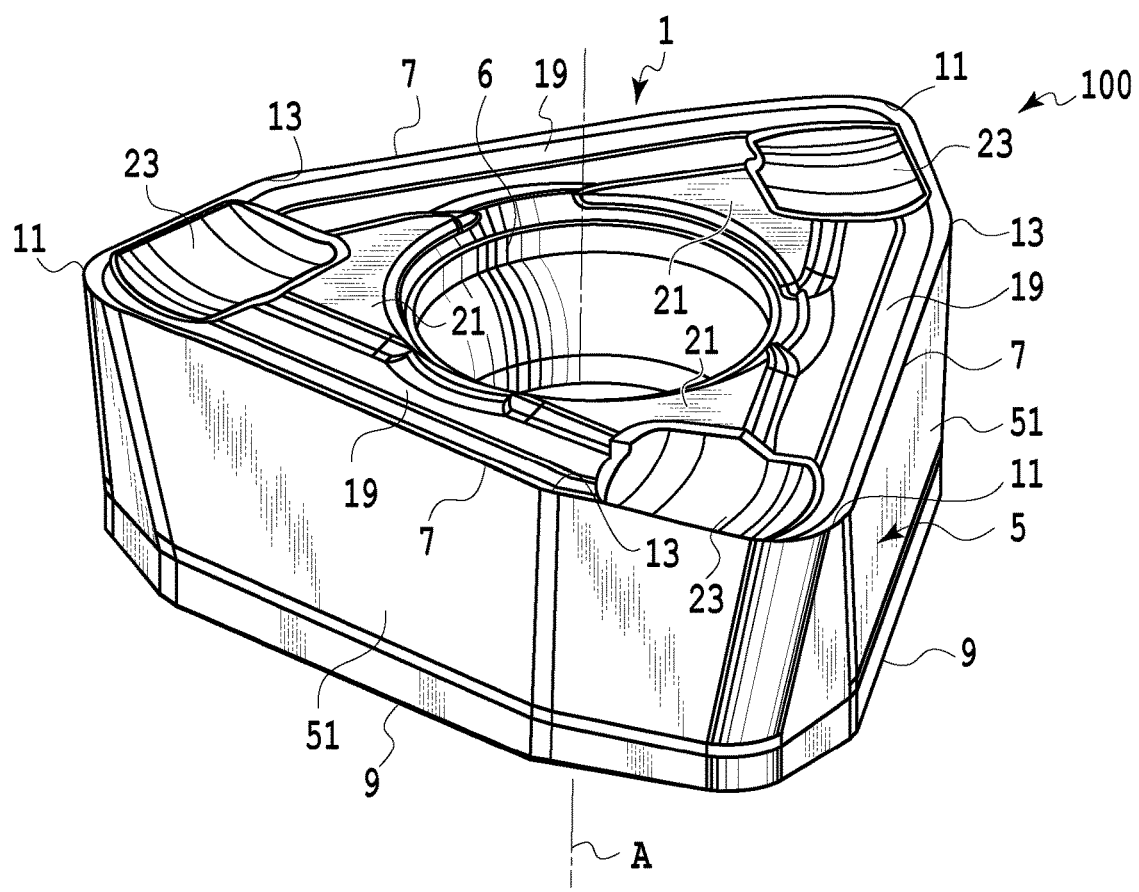
FIG. 1 is a perspective view of a cutting insert according to an embodiment of the present invention when seen from one end surface side.
Figure 2:
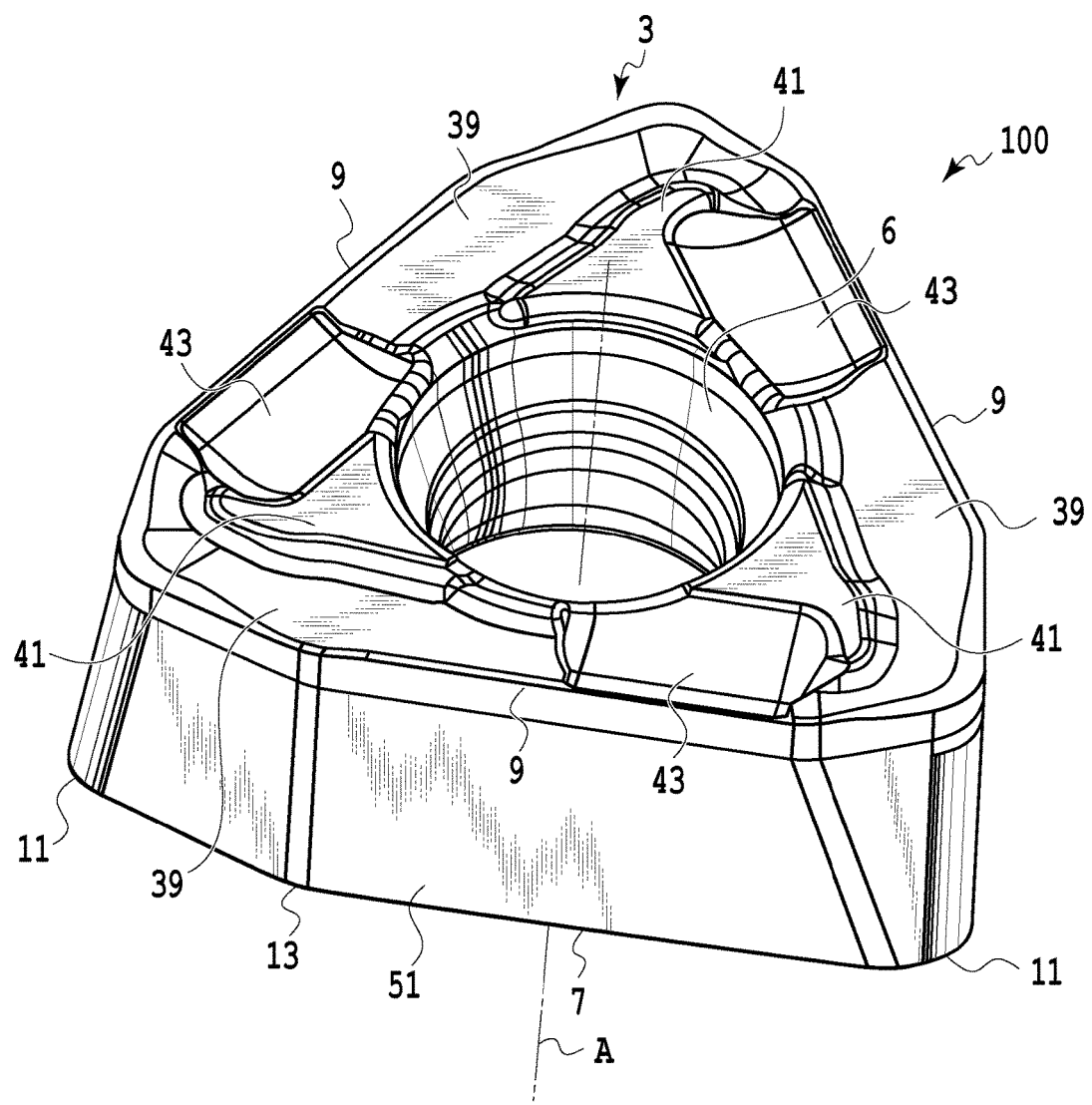
FIG. 2 is a perspective view of the cutting insert shown in FIG. 1 when seen from the other end surface side.

An embodiment of the present invention will be described referring to the drawings.

The cutting insert according to the embodiment of the present invention has a major feature that the cutting insert includes two opposite end surfaces and a circumferential side surface extending therebetween, wherein a depressed portion is formed in the end surface along a part of the single cutting edge formed on the intersecting ridge portion between one end surface and the circumferential side surface.

FIGS. 1 to 5 show a cutting insert 100 according to an embodiment of the present invention. As the drawing shows, the cutting insert 100 of the embodiment includes two end surfaces 1 and 3 facing each other or facing opposite to each other, and a circumferential side surface 5 connecting the end surfaces or extending therebetween. In the following description, the end surface 1, which is one end surface, directed to an upper side in FIG. 1 will be referred to as an upper surface, and the end surface 3, which is the other end surface, will be referred to as a lower surface. Based on the relative positional relationship between the upper and lower surfaces, those terms "upper" and "lower" will be used in the following explanation. However, it will be understood that those terms do not limit the direction and position of the cutting insert but are used simply for facilitating the understanding, and are not intended to limit the present invention.

Figure 3:
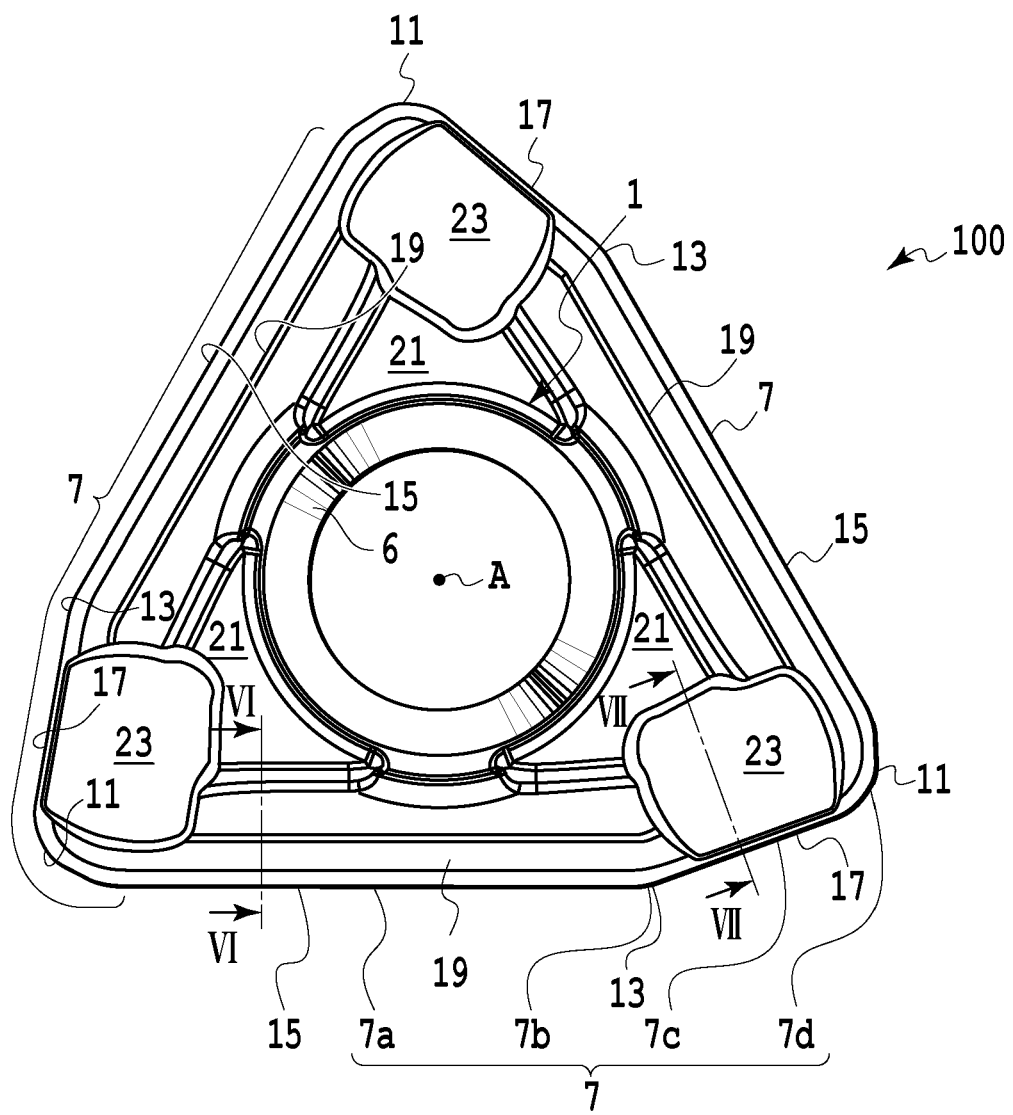
FIG. 3 is a front view of the cutting insert shown in FIG. 1.

The upper surface 1 has a substantially triangular shape when the cutting insert 1 is seen from the side facing the upper surface 1, that is, in FIG. 3. Likewise, the lower surface 3 has a substantially triangular shape when the cutting insert is seen from the side facing the lower surface 3, that is, in FIG. 4.

In the cutting insert 100, a mounting hole 6 as a through hole is formed so as to pass through the upper surface 1 and the lower surface 3. Therefore, in the substantially center part of each of the upper surface 1 and the lower surface 3 a substantially circular opening of the mounting hole 6 is formed. Basically, the cutting insert 100 has a shape that is 120° rotationally symmetrical around a center axis A of the mounting hole 6. The cutting insert 100 is an indexable cutting insert.

In the cutting insert 100, an upper surface side cutting edge 7 as a peripheral cutting edge, that is, a peripheral edge is formed on the intersecting ridge portion between the upper surface 1 and the circumferential side surface 5. Meanwhile, a lower surface side cutting edge 9 as a center cutting edge, that is, a center edge is formed on the intersecting ridge portion between the lower surface 3 and the circumferential side surface 5. In the following description, the upper surface side cutting edge 7 will be simply referred to as an upper cutting edge, and likewise, the lower surface side cutting edge 9 will be simply referred to as a lower cutting edge.

The upper cutting edge 7 is formed so that the upper surface 1 functions as a rake face, and a part of the circumferential side surface 5 functions as a flank. The lower cutting edge 9 is formed so that the lower surface 3 functions as the rake face, and a part of the circumferential side surface 5 functions as the flank. The upper cutting edge 7 as the peripheral edge is configured to cut the outer portion of the bottom of the hole when the cutting insert 100 is mounted to the tool body to be described later. The lower cutting edge 9 as the center edge is configured to cut the center part of the bottom of the hole when the cutting insert 100 is mounted to the tool body.

The cutting insert 100 is basically of negative type. However, the cutting insert 100 has the upper surface 1 partially extended wider than the lower surface 3, and accordingly the cutting insert 1 is formed so that an acute angle is formed between the upper surface 1 and the circumferential side surface 5 in the extended part. Specifically, in the case where the cutting insert 100 is mounted to the tool body to make one of the upper cutting edges 7 usable, the cutting insert 100 is configured to create a positive relief angle at a portion around the corner portion located at the tool outer circumferential side or at radially outer side, of the operable upper cutting edge 7.

Referring to FIG. 3, the upper surface 1 has a substantially triangular outline shape with three first corner portions 11 each as the vertex at the acute angle. More specifically, the upper surface 1 has the outline shape having three acute-angled first corner portions 11 and three obtuse-angled second corner portions 13 alternately arranged. The upper cutting edge 7 includes a part extending between two adjacent acute-angled first corner portions 11, and a part extending along one of the first corner portions 11. In more detail, the upper cutting edge 7 includes a long cutting edge portion 7a extending along a long side 15 of the upper surface 1, a second corner cutting edge portion 7b formed at a second corner portion 13, a short cutting edge portion 7c extending along the short side 17 shorter than the long side 15, and a first corner cutting edge portion 7d extending along the first corner portion 11. Those portions are continuous to each other. In this way, each of the upper cutting edges 7 includes four cutting edge portions 7a, 7b, 7c and 7d. The cutting insert 100 includes three upper cutting edges 7. Those three upper cutting edges 7 are 120° rotational symmetrical around the center axis A of the mounting hole 6. The cutting insert 100 may be configured to have three continuous upper cutting edges 7 at the intersecting ridge portion between the upper surface 1 and the circumferential side surface 5. However, they do not have to be necessarily continuous.

Figure 4:
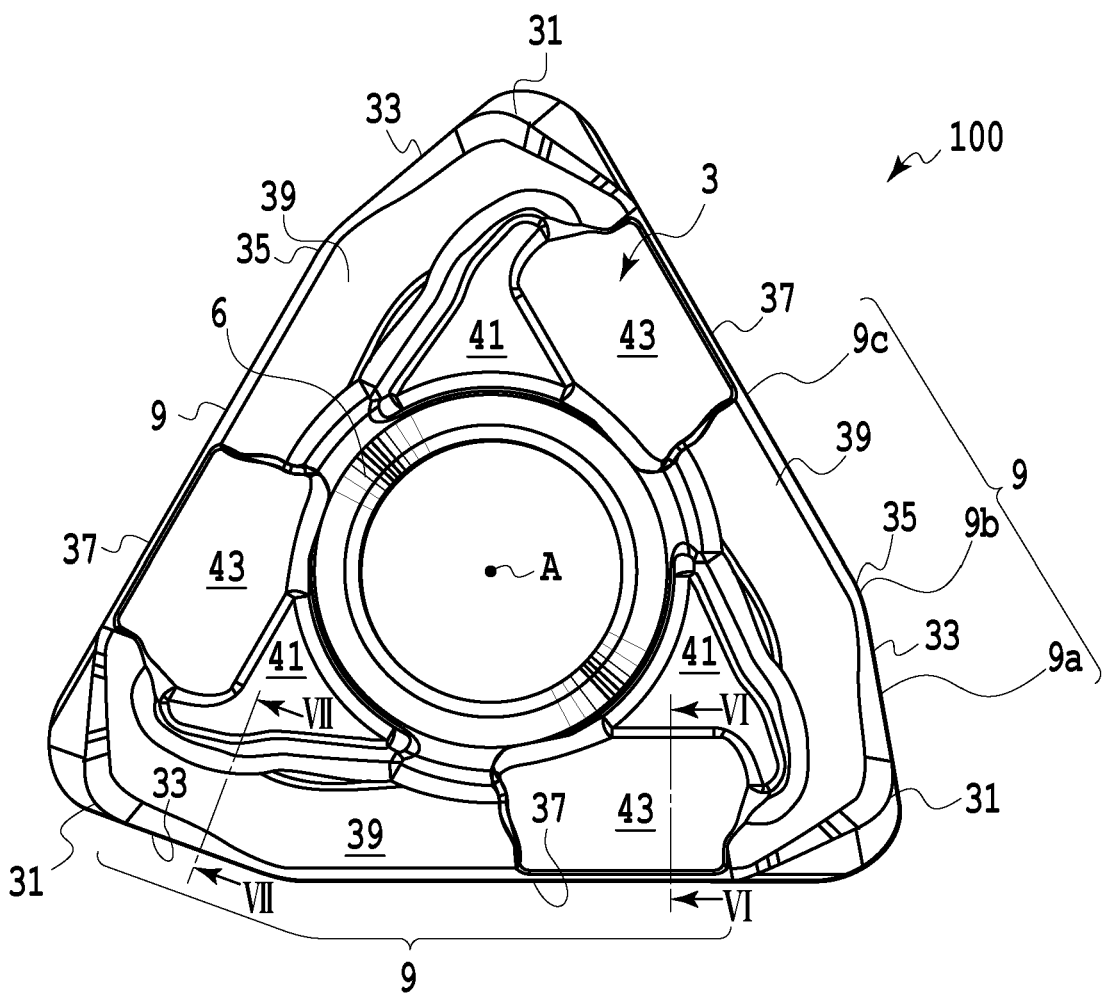
FIG. 4 is a rear view of the cutting insert shown in FIG. 1.
Figure 5:
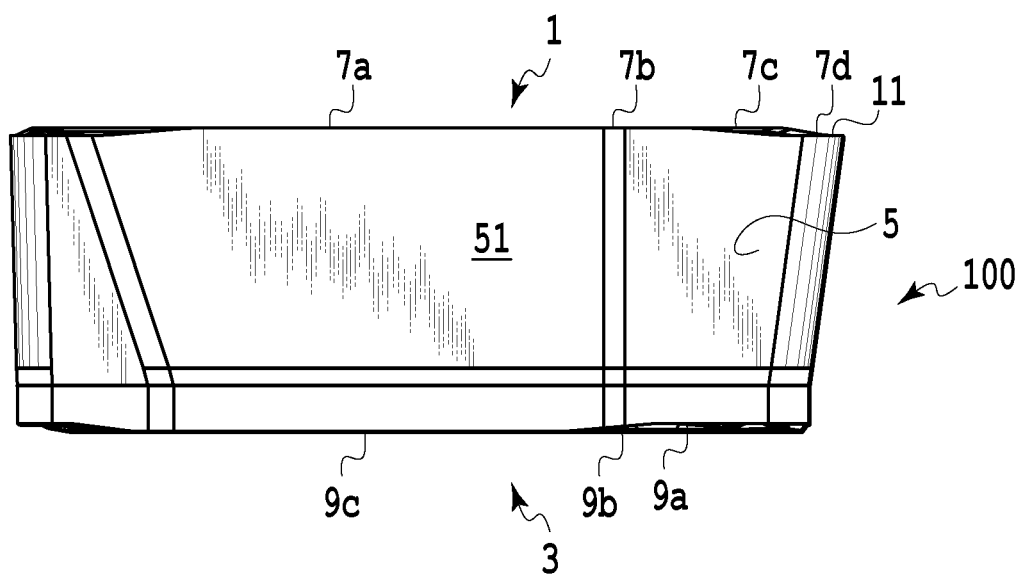
FIG. 5 is a bottom view of the cutting insert shown in FIG. 1.

Referring to FIG. 4, the lower surface 3 has a substantially triangular outline shape. The lower cutting edge 9 is formed to extend between adjacent vertexes of the triangular shape, that is, between the first corner portions 31. The lower cutting edge 9 includes a short cutting edge portion 9a extending along a short side 33 of the lower surface 3, a corner cutting edge portion 9b extending along the obtuse-angled corner portion 35, and a long cutting edge portion 9c extending along a long side 37, which is longer than the short side 33, of the lower surface 3. Those portions are continuous to each other. In this way, each of the lower cutting edges 9 includes three cutting edge portions 9a, 9b and 9c. The cutting insert 100 includes the three lower cutting edges 9. Those three lower cutting edges 9 are 120° rotationally symmetrical around the center axis A of the mounting hole 6. In the cutting insert 100, the three lower cutting edges 9 are discontinuous but may be continuous to each other on the intersecting ridge portion between the lower surface 3 and the circumferential side surface 5.

A side surface portion 51 is formed between the single upper cutting edge 7 and the lower cutting edge 9 in substantially alignment with the upper cutting edge 7 in the direction of the axis A so as to be able to function as the flank for those cutting edges. As the cutting insert 100 includes three upper cutting edges 7 and three lower cutting edges 9, three side surface portions 51 are formed. The three side surface portions 51 are circumferentially arranged and partially constitute the circumferential side surface 5, respectively.

Figure 6:
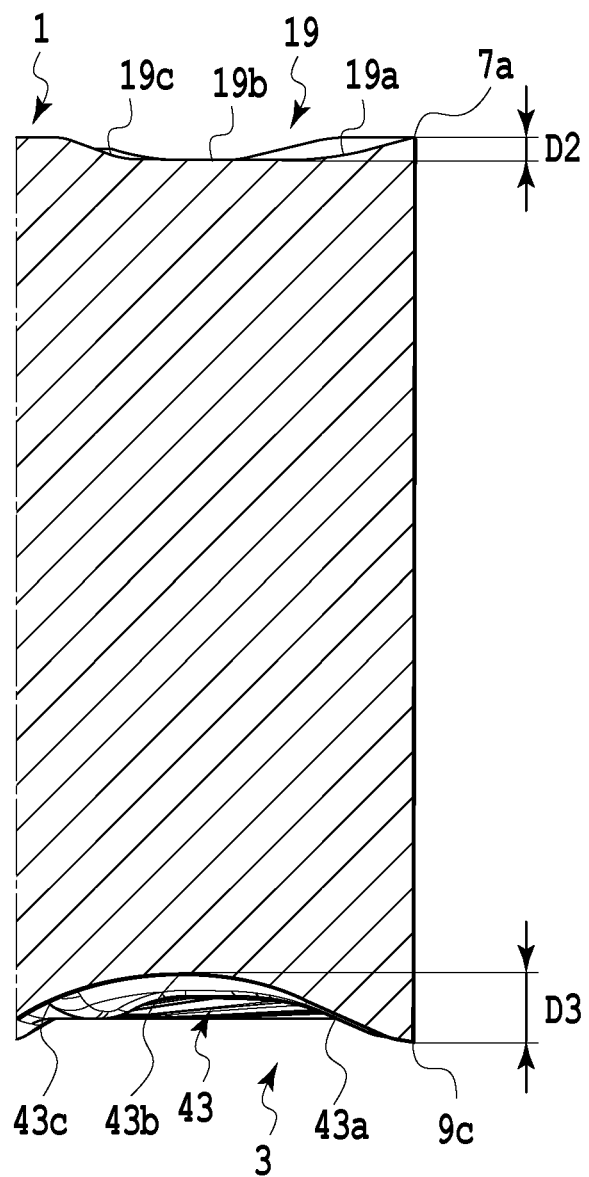
FIG. 6 is a sectional view of a part of the cutting insert shown in FIG. 1 taken along a line VI-VI of FIG. 3.

The upper surface 1 has a chip breaker groove 19 as a groove part formed along the upper cutting edge 7. There are three upper cutting edges 7, and accordingly, three chip breaker grooves 19 are formed in the upper surface 1. Here, FIG. 6 is referred to, which is a sectional view of a part of the cutting insert 100 taken along a line VI-VI of FIG. 3. FIG. 6 shows a cross section of the chip breaker groove 19 in a plane in parallel with the axis A, the plane being orthogonal to the long cutting edge portion 7a when the cutting insert 100 is seen from a side opposite to the upper surface 1, that is, in FIG. 3. As FIG. 6 shows, the chip breaker groove 19 is configured to include an inclined surface 19a arranged in adjacent to or in the vicinity of the related upper cutting edge 7 and inclined toward the lower surface 3 side, a breaker groove bottom 19b connected to the inclined surface 19a, and a rising wall surface 19c that is connected to the breaker groove bottom 19b and inclined in the direction apart from the lower surface 3. The inclined surface 19a can particularly function as a rake face of the upper cutting edge 7. The rising wall surface 19c can particularly function as a chip breaker wall surface.

Figure 7:
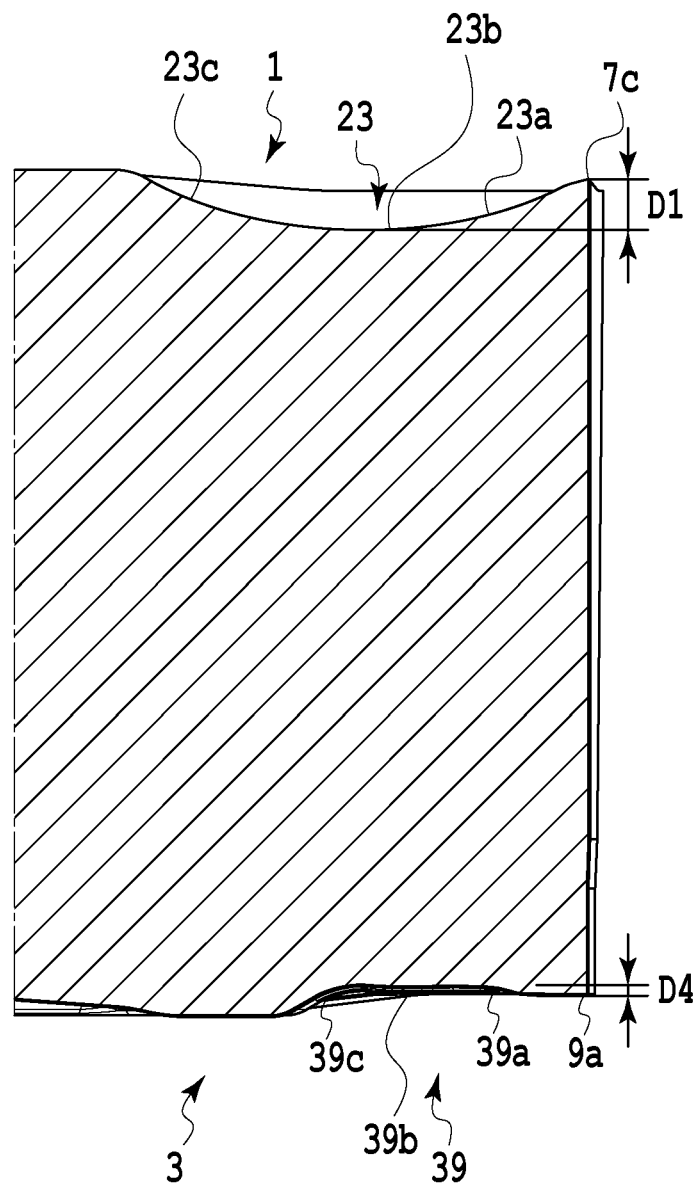
FIG. 7 is a sectional view of a part of the cutting insert shown in FIG. 1 taken along a line VII-VII of FIG. 3.

Likewise, a chip breaker groove 39 as a groove part is formed also in the lower surface 3 along the lower cutting edge 9. There are three lower cutting edges 9, and accordingly, three chip breaker grooves 39 are formed in the lower surface 3. Here, FIG. 7 is referred to, which is a sectional view of a part of the cutting insert 100 taken along a line VII-VII of FIG. 3. FIG. 7 is a sectional view taken along the line VII-VII orthogonal to the cutting edge portion 9a shown in FIG. 4. The chip breaker groove 39, as shown in FIG. 7, like the chip breaker groove 19 of the upper surface 1, also is configured to include an inclined surface 39a arranged in adjacent to or in the vicinity of the related lower cutting edge 9 and inclined toward the upper surface 1 side, a breaker groove bottom 39b connected to the inclined surface 39a, and a rising wall surface 39c that is connected to the breaker groove bottom and inclined in the direction apart from the upper surface 1. The inclined surface 39a can particularly function as a rake face of the lower cutting edge 9. The rising wall surface 39c can particularly function as the chip breaker wall surface.

In the upper surface 1, three raised portions 21 are formed around the mounting hole 6 so as to protrude in a direction of the axis A and each of them has a flat tip end. The tip end of the raised portion may have an arbitrary shape other than the flat shape. Each of the three raised portions 21 is formed to function as a seating surface or an abutment surface that abuts on the bottom wall surface of the insert mounting seat of the tool body when the cutting insert 100 is mounted to the tool body for making one of the lower cutting edges 9 usable. The aforementioned chip breaker groove 19 extends between the cutting edge 7 and the raised portion 21 or the mounting hole 6. Three raised portions 21 are separately formed, but may be formed to be continuous to each other.

In the lower surface 3, three raised portions 41 are formed around the mounting hole 6 so as to protrude in a direction of the axis A and each of them has a flat tip end. The tip end of the raised portion may have an arbitrary shape other than the flat shape. Each of the three raised portions 41 is formed to function as a seating surface or an abutment surface that abuts on the bottom wall surface of the insert mounting seat of the tool body when the cutting insert 100 is mounted to the tool body for making one of the upper cutting edges 7 usable. The aforementioned chip breaker groove 39 extends between the lower cutting edge 9 and the raised portion 41 or the mounting hole 6. Three raised portions 41 are separately formed, but may be formed to be continuous to each other.

As FIGS. 1 to 4, and FIGS. 6 to 9 show, in the upper and lower surfaces 1 and 3, depressed portions 23 and 43 are further formed, respectively. The depressed portion 23 of the upper surface 1 will be described.

The upper surface 1 includes three depressed portions 23, each of which is associated with the upper cutting edge 7. The depressed portion 23 is formed along the part not having the chip breaker groove 19 of the upper cutting edge 7. The depressed portion 23 is formed near one end of the upper cutting edge 7, that is, near the first corner portion 11 on which the first corner cutting edge portion 7d extends. Specifically, the depressed portion 23 is provided in the vicinity of the short cutting edge portion 7c and the first corner cutting edge portion 7d of the upper cutting edge 7. Particularly, the depressed portion 23 is formed along the short cutting edge portion 7c. The cutting insert 100 is mounted to the tool body so that the first corner portion 11 near which the depressed portion 23 is disposed, that is, the first corner cutting edge portion 7d is positioned at the outer periphery side of the drill as the cutting tool.

Here, FIG. 7 is referred to, which is a sectional view of the cutting insert 100 taken along the line VII-VII of FIG. 3. FIG. 7 shows a cross section of the depressed portion 23 in a plane in parallel with the axis A, the plane being orthogonal to the short cutting edge portion 7c when the cutting insert 100 is seen from a side opposite to the upper surface 1, that is, in FIG. 3. As the sectional view of FIG. 7 shows, the depressed portion 23 is formed such that it has its depth increasing as it goes apart from the upper cutting edge 7, and thereafter, the depth is reduced, preferably, it is gradually made shallow. The depressed portion 23, as FIG. 7 shows, like the chip breaker groove 19 of the upper surface 1, is configured to include an inclined surface 23a provided in the vicinity of the upper cutting edge 7 and inclined toward the lower surface 3 side, a depressed portion bottom 23b connected to the inclined surface 23a, and a rising wall surface 23c which is connected to the depressed portion bottom 23b and inclined in the direction apart from the lower surface 3. The inclined surface 23a of the depressed portion 23 has an inclination angle (angle with respect to the plane defined to be orthogonal to the axis A) larger than that of the inclined surface 19a of the chip breaker groove 19. Particularly, the inclined surface 23a can function as the rake face of the upper cutting edge 7. Therefore, the depressed portion 23 contributes to creating the larger positive rake angle of the upper cutting edge 7, compared with the chip breaker groove 19. Particularly, the rising wall surface 23c can function as the chip breaker wall surface.

Expressing intuitively, the depressed portion 23 is shaped as if the upper surface 1 is gouged from the upper cutting edge 7 side in FIG. 3. The depressed portion 23 has a shape gouged in the direction orthogonal to the cutting edge 7 in this way instead of having a shape gouged in a direction parallel with the upper cutting edge 7. As a result, the chip generated due to cutting of the upper cutting edge 7 is likely to be smoothly rounded. The depressed portion 23 is formed as if even the part of the raised portion 21 is gouged.

The thus shaped depressed portion 23 is continuous to the chip breaker groove 19 formed along the part not having the depressed portion of the upper cutting edge, and defines a recess portion along the upper cutting edge 7, together with the chip breaker 19. In the cutting insert 100, the single depressed portion 23 is continuous to the two chip breaker grooves 19. However, the single recess portion 23 is associated with the single cutting edge 7, and therefore it is only required that the recess portion is continuous to the single chip breaker groove 19 at a portion on the second corner portion 13 side of the related cutting edge 7.

Figure 8:
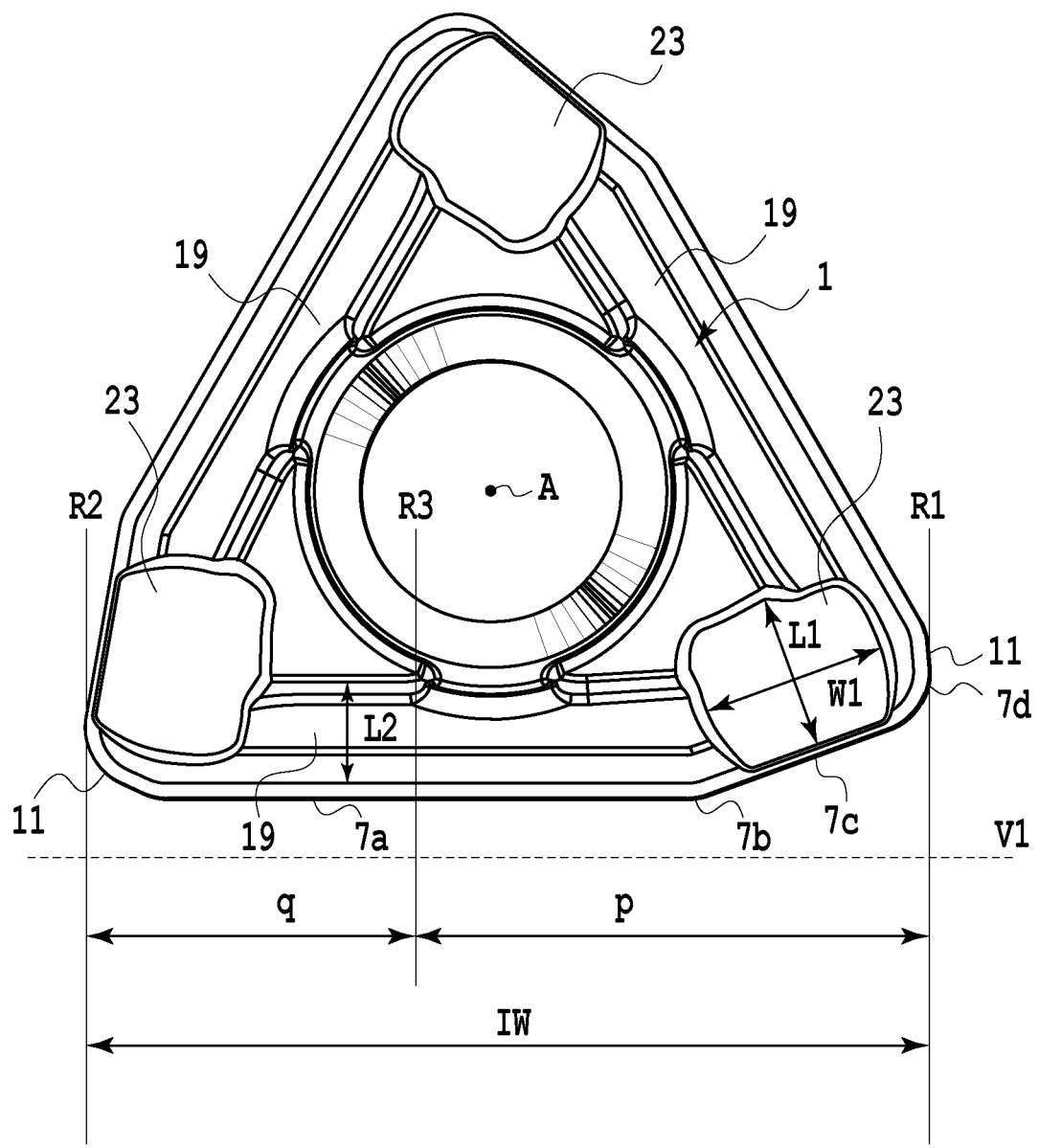
FIG. 8 is an explanatory view corresponding to FIG. 3, showing a shape of one end surface of the cutting insert shown in FIG. 1.

The depressed portion 23 has a depth D1 larger than a depth D2 of the chip breaker groove 19. Those depths D1, D2 are defined as lengths from the cutting edge 7 in the direction of axis A as shown in FIGS. 6 and 7. Referring to FIG. 8, the length of the substantially quadrilateral depressed portion 23 in a direction orthogonal to the cutting edge 7, that is, the right-angle length L1 is at least longer than the right-angle length L2 of the chip breaker groove 19. However, the right-angle length in this case refers to the length in the direction orthogonal to the cutting edge 7 in FIG. 8 that is the same as FIG. 3. A width W1 of the depressed portion 23 is set in the range defined as described below. However, the width W1 of the depressed portion 23 is the length in the direction orthogonal to the direction of the right-angle length L1 in FIG. 8, that is, the length in the direction along the cutting edge 7.

The width W1 of the depressed portion 23 is defined in a drawing when the cutting insert 100 is seen from the side opposite to the upper surface 1, that is, FIG. 8. FIG. 8 shows a virtual line V1 which is orthogonal to the axis A and substantially in parallel with the long cutting edge portion 7a of the single upper cutting edge 7 shown in FIG. 8. Three defining lines R1, R2 and R3 orthogonal to the virtual line V1 can be defined in FIG. 8. The defining line R1 is in contact with the outermost periphery of the first corner portion 11 connected to the short cutting edge portion 7c of the related upper cutting edge 7 in FIG. 8. The defining line R2 is in contact with the outermost periphery of the first corner portion 11 connected to the long cutting edge portion 7a of the related upper cutting edge 7 in FIG. 8. Assuming that the length of the cutting insert 100 (length between the lines R1 and R2) in a direction parallel with the virtual line V1 is defined as the width IW of the cutting insert 100 in FIG. 8, the defining line R3 passes through the internally dividing point that internally divides the width IW to p:q from the line R1 side. The width W1 of the depressed portion 23 is set so that the depressed portion 23 is accommodated within the region between the thus defined defining lines R1 and R3. Particularly in this case, assuming that the length of the cutting insert 100 in a direction substantially parallel with the long cutting edge portion 7a of the single cutting edge 7 is its width IW in FIG. 8, the width W1 of the depressed portion 23 is set to (p/(p+q)×100) % or less of the width IW. In this case, p is six and q is four, but the p and q may be set to other arbitrary values.

The lower surface 3 has three depressed portions 43, each of which is associated with the lower cutting edge 9. The depressed portion 43 is formed along the part not having the chip breaker groove 39 of the lower cutting edge 9, and provided along the long cutting edge portion 9c of the lower cutting edge 9. Particularly, the depressed portion 43 is located at the position near one end of the long cutting edge portion 9c of the related lower cutting edge 9 at the side different from the corner cutting edge portion 9b.

As shown by the sectional view of FIG. 6, taken along the line VI-VI orthogonal to the cutting edge portion 9c shown in FIG. 4, the depressed portion 43 is formed such that it has its depth increasing as it goes apart from the lower cutting edge 9, and decreasing thereafter. That is, like the chip breaker groove 39 in the lower surface 3, the depressed portion 43 is configured to have an inclined surface 43a that is provided in the vicinity of the lower cutting edge 9 and inclined toward the upper surface 1 side, a depressed portion bottom 43b connected to the inclined surface 43a, and a rising wall surface 43c that is connected to the depressed portion bottom 43b and inclined in the direction apart from the upper surface 1. The inclined surface 43a of the depressed portion 43 has the larger inclination angle than that of the inclined surface 39a of the chip breaker groove 39. Particularly, the inclined surface 43a can function as the rake face of the lower cutting edge 9. Therefore, the depressed portion 43 contributes to creating the larger positive rake angle of the lower cutting edge 9, compared with the chip breaker groove 39. Particularly, the rising wall surface 43c can function as the chip breaker wall surface.

Expressing intuitively, the depressed portion 43 is shaped as if the lower surface 3 is gouged from the lower cutting edge 9 side in FIG. 4. The depressed portion 43 has a shape gouged in the direction orthogonal to the lower cutting edge 9 in this way instead of having a shape gouged in a direction parallel with the lower cutting edge 9. As a result, the chip generated due to cutting of the lower cutting edge 9 is likely to be smoothly rounded. The recess portion 43 is formed as if even the part of the raised portion 41 is gouged.

The thus shaped depressed portion 43 is continuous to the chip breaker groove 39 formed along the part not having the depressed portion of the lower cutting edge, and defines a recess portion along the lower cutting edge 9 together with the chip breaker groove 39. In the cutting insert 100, the single depressed portion 43 is continuous to the two chip breaker grooves 39. However, the single depressed portion 43 is associated with the single lower cutting edge 9, it is therefore only required that the single depressed portion 43 is continuous to the single chip breaker groove 39 in a part on the short cutting edge portion 9a side of the related lower cutting edge 9.

Figure 9:
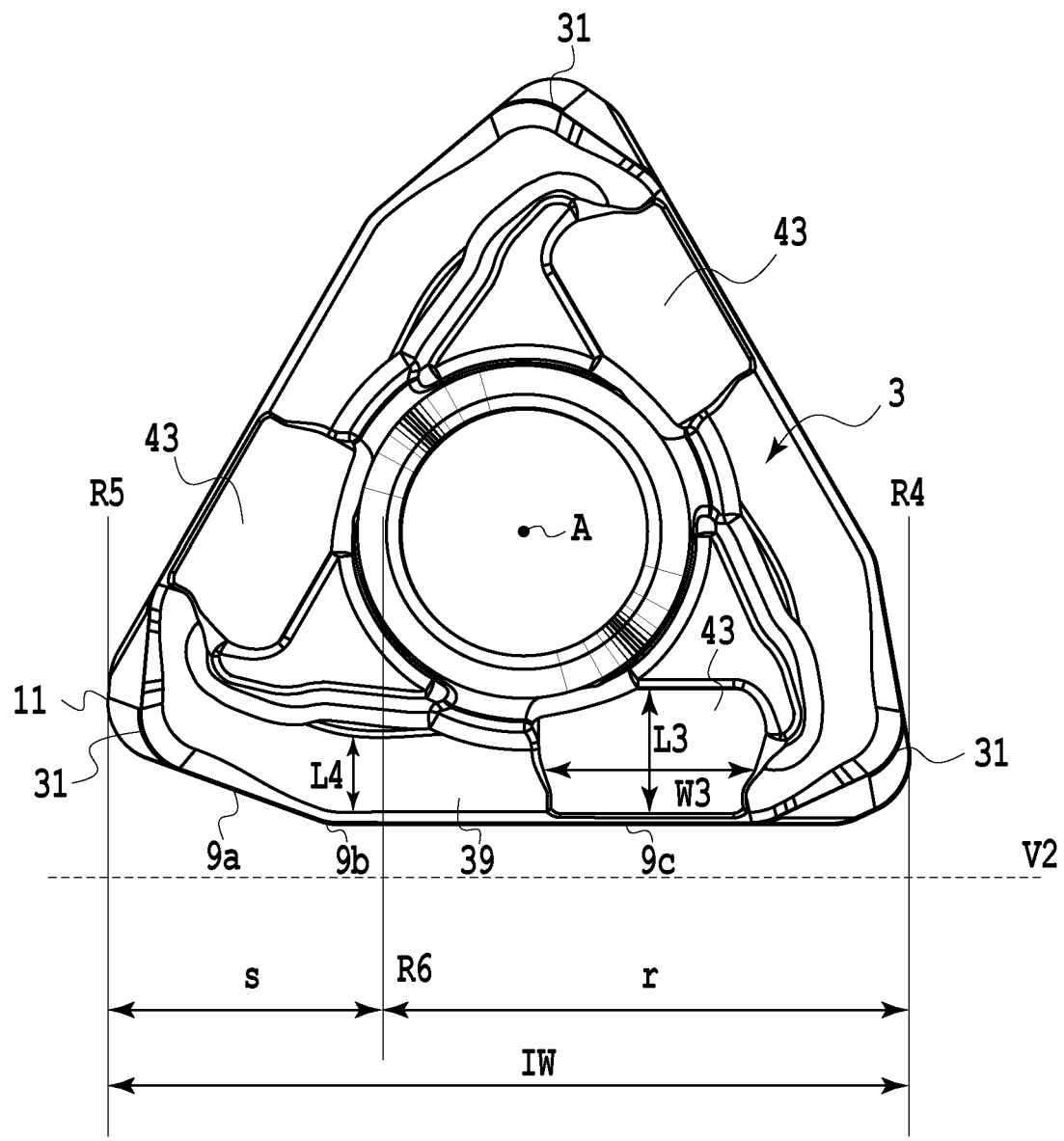
FIG. 9 is an explanatory view corresponding to FIG. 4, showing a shape of the other end surface of the cutting insert shown in FIG. 1.
Figure 10:
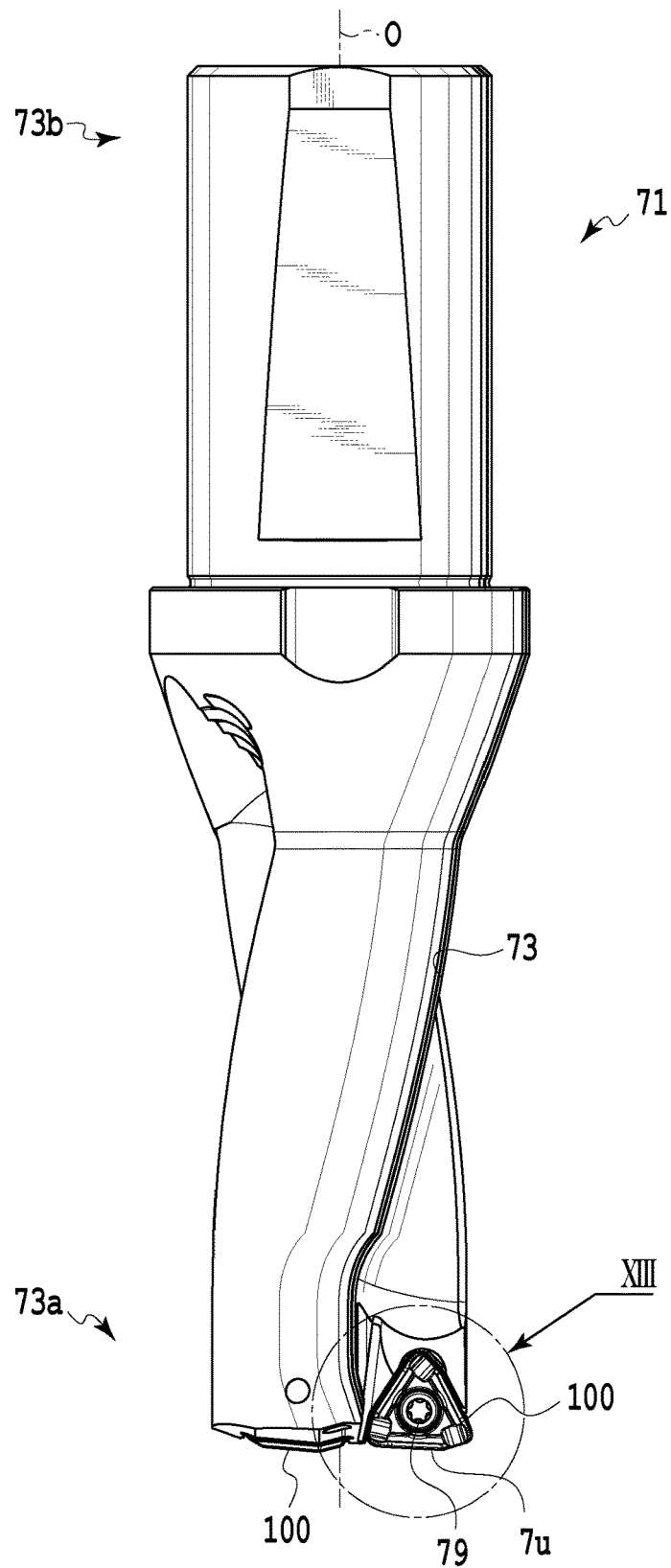
FIG. 10 is a front view of a cutting edge replaceable drill according to an embodiment of the present invention, to which the cutting insert shown in FIG. 1 is detachably mounted.
Figure 11:
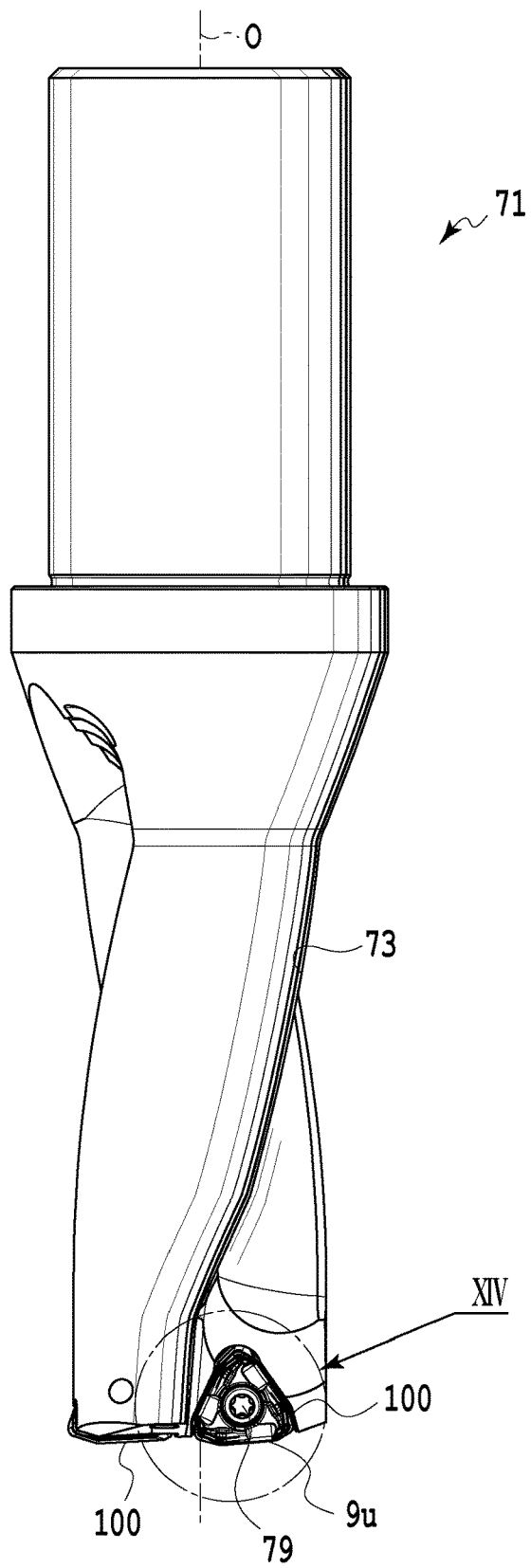
FIG. 11 is a rear view of the drill shown in FIG. 10.
Figure 12:
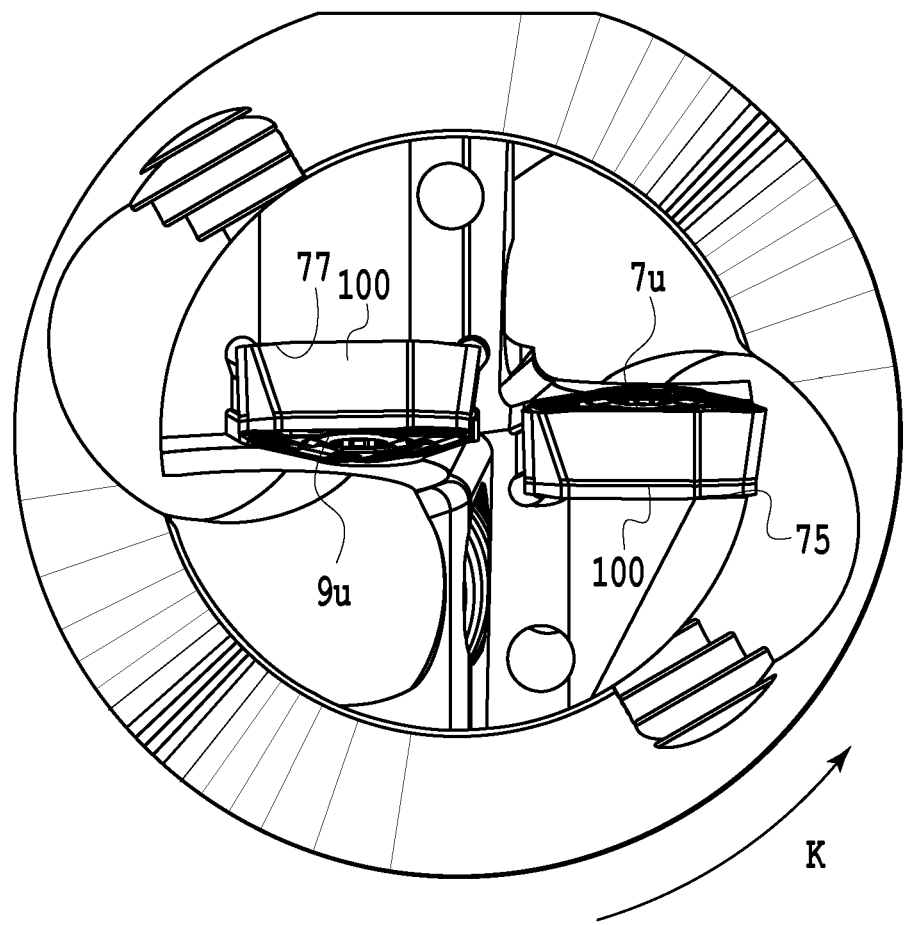
FIG. 12 is a view of the drill shown in FIG. 10 when seen from a leading end side.
Figure 13:
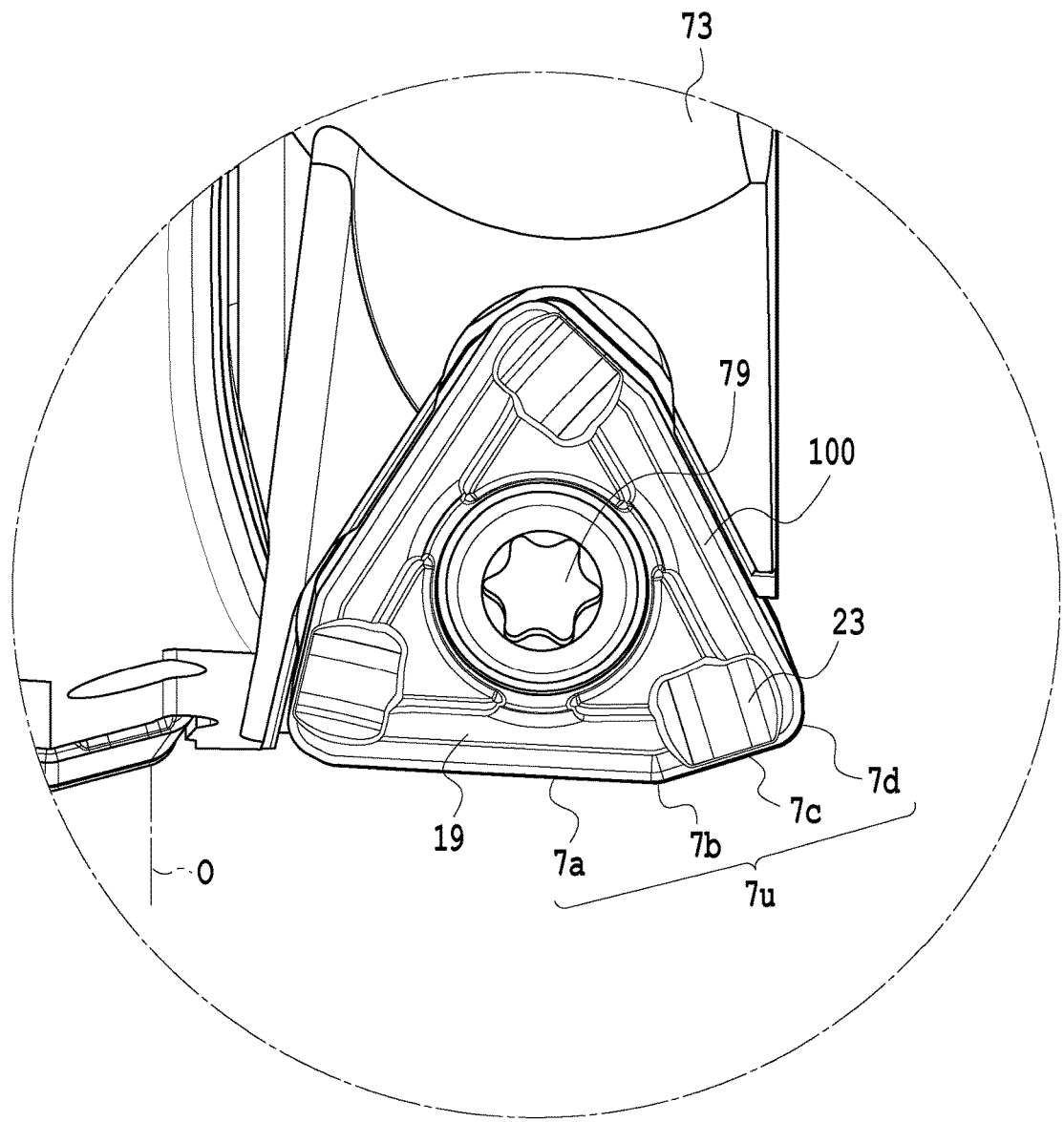
FIG. 13 is a partially enlarged view of an area enclosed with a circle XIII of FIG. 10.
Figure 14:
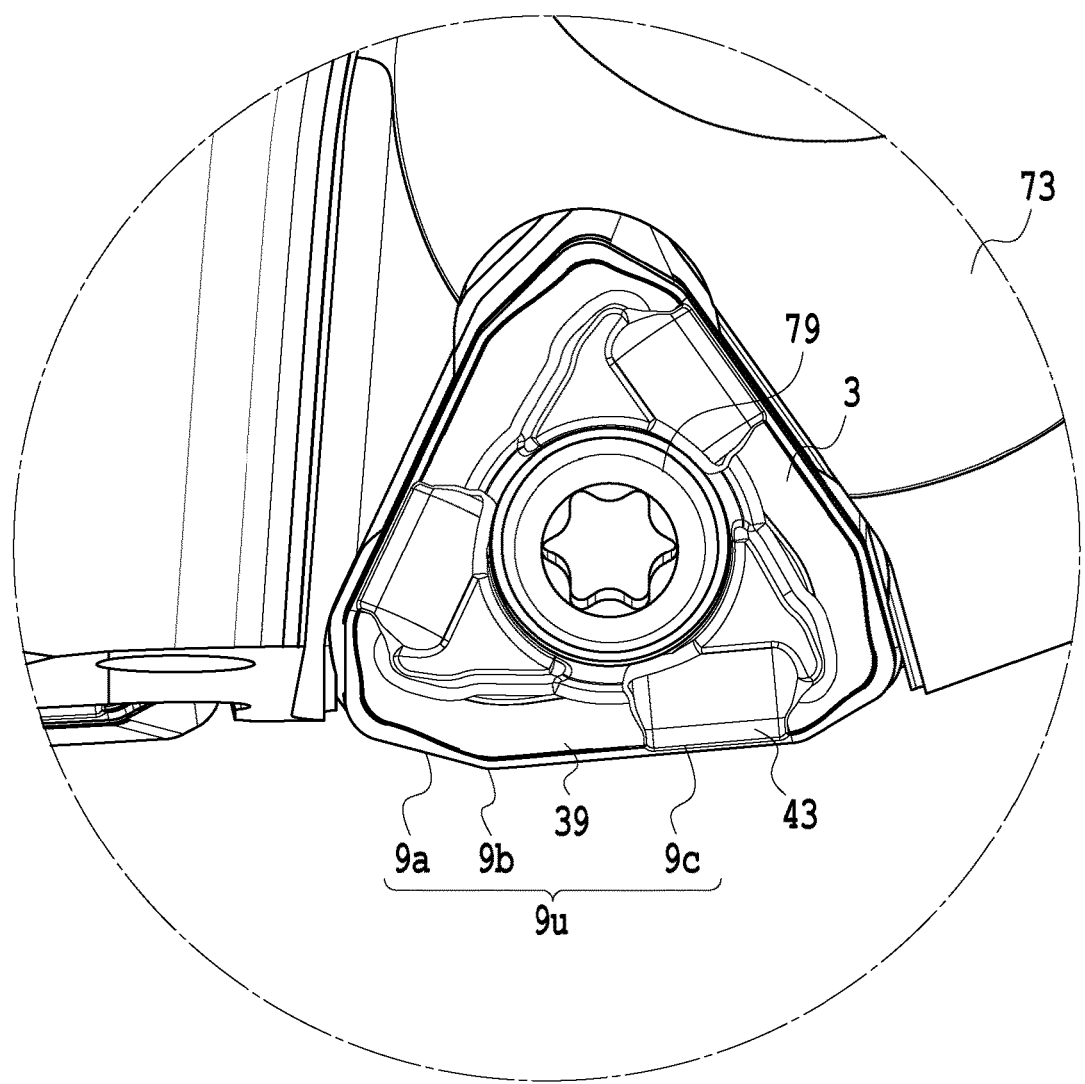
FIG. 14 is a partially enlarged view of an area enclosed with a circle XIV of FIG. 11.

A depth D3 of the depressed portion 43 is larger than a depth D4 of the chip breaker groove 39. However, those depths D3 and D4 are defined as in the case of the depths D1 and D2. Referring to FIG. 9, the length of the substantially quadrilateral depressed portion 43 in the direction orthogonal to the lower cutting edge 9, that is, the right-angle length L3 is at least longer than the right-angle length L4 of the chip breaker groove 39. However, those right-angle lengths are defined in the same manner as those of the depressed portion 23. The width W3 of the depressed portion 43 is set to be in the range defined as below. However, the width W3 of the depressed portion 43 is defined in the same manner as in the case of the depressed portion 23.

The width W3 of the depressed portion 43 is defined in a drawing when the cutting insert 100 is seen from the side opposite to the lower surface 3, that is, in FIG. 9. FIG. 9 shows a virtual line V2 which is orthogonal to the axis A and substantially in parallel with the long cutting edge portion 9c of the single lower cutting edge 9 shown in FIG. 9. Three defining lines R4, R5 and R6 orthogonal to the virtual line V2 can be defined in FIG. 9. The defining lines R4 and R5 are in contact with the outermost portions of the cutting insert 100, respectively in FIG. 9. Assuming that the length of the cutting insert 100 (length between the lines R4 and R5) in a direction parallel with the virtual line V2 is defined as the width IW of the cutting insert 100 in FIG. 9, the defining line R6 passes through the internally dividing point that internally divides the width to r:s from the line R4 side on the long cutting edge portion 9c side of the related lower cutting edge 9. The width W3 of the depressed portion 43 is set so that the depressed portion 43 is accommodated within the region between the thus defined defining lines R4 and R6. In other words, in FIG. 9, assuming that the length of the cutting insert 100 in a direction substantially parallel with the long cutting edge portion 9c of the single lower cutting edge 9 is set to its width IW, the width W3 of the depressed portion 43 is set to (r/(r+s)×100)% or less of the width IW. Here, r is six and s is four, but the r and s may be set to other arbitrary values. The width IW shown in FIG. 8 is the same as the width IW shown in FIG. 9.

Note that the upper surface 1 corresponds to the first end surface according to the present invention, and the lower surface 3 corresponds to the second end surface according to the present invention. However, these relationships may be inverted. The upper cutting edge 7 corresponds to the first cutting edge according to the present invention, and the lower cutting edge 9 corresponds to the second cutting edge according to the present invention. Accordingly, the chip breaker groove 19 and the depressed portion 23 correspond to the first groove portion and the first depressed portion according to the present invention, respectively, and the chip breaker groove 39 and the depressed portion 43 correspond to the second groove portion and the second depressed portion according to the present invention, respectively. However, as in the case of the end surface, these relationships of the cutting edges, the groove portions and the depressed portions may be inverted.

A cutting edge replaceable drill 71 as the cutting edge replaceable rotary cutting tool to which the aforementioned cutting insert 100 is detachably mounted will be described in reference to FIGS. 10 to 14.

The drill 71 includes a drill body, that is, a tool body 73, in which a rotation axis O extending from a leading end portion 73a to a rear end portion 73b is defined. The tool body 73 includes two insert mounting seats 75, 77 at the leading end portion 73a. The outer circumferential side insert mounting seat (hereinafter referred to as an outer insert mounting seat) 75 is located at the radial outer side, that is, outer periphery side of the tool body, to which the cutting insert 100 can be mounted for the purpose of using the aforementioned upper cutting edge 7. When the cutting insert 100 is mounted to the outer insert mounting seat 75, the lower surface 3 abuts on a bottom wall surface which is not shown, and the circumferential side surface 5 abuts on a side wall surface which is not shown. Then a screw 79 as fixing means is tightly screwed in a screw hole of the bottom wall surface via the mounting hole 6. A center side insert mounting seat (hereinafter referred to as an inner insert mounting seat) 77 is located at a radial center side or inner side of the tool body 73, to which the cutting insert 100 can be mounted for the purpose of using the aforementioned lower cutting edge 9. When the cutting insert 100 is mounted to the inner insert mounting seat 77, the upper surface 1 abuts on a bottom wall surface which is not shown, and the circumferential side surface 5 abuts on a side wall surface which is not shown. Then a screw 79 is tightly screwed in the screw hole of the bottom wall surface via the mounting hole 6. In this way, the drill 71 to which the two cutting inserts 100 are mounted is rotated in a tool rotary direction K around the rotation axis O so as to be used for cutting the workpiece.

Here, the upper surface 1 corresponds to the first end surface according to the present invention, and the lower surface 3 corresponds to the second end surface according to the present invention. Accordingly, the outer insert mounting seat corresponds to the first insert mounting seat, and the inner insert mounting seat corresponds to the second insert mounting seat. However, these relationships of the insert mounting seats may be inverted, as in the case of the end surface and the cutting edge.

Operations and effects derived from the above-structured cutting insert 100 and the drill 71 detachably mounted with the cutting insert will be described.

As understood from FIGS. 11 to 14, in the drill 71, an operable upper cutting edge 7u that includes the first corner cutting edge portion 7d protruding to the outer side in a substantially radial direction with respect to the rotation axis O is located at the radial outer side, that is, the outer circumferential side, compared with an operable lower cutting edge 9u, and functions as the peripheral edge. In the state where the cutting insert 100 is mounted on the outer insert mounting seat 75, the operable first cutting edge 7u extends substantially in the radial direction with respect to the tool center axis O, and is located so that the second corner cutting edge portion 7b formed at the obtuse-angled second corner portion 13 protrudes toward the leading end side of the tool. Therefore, the operable upper cutting edge 7u can bite the workpiece in a more improved way. As the first corner cutting edge portion 7d at the radial outer side protrudes to the radial outer side with respect to the tool rotation axis O, and the positive relief angle is formed, the operable upper cutting edge 7u can exhibit excellent sharpness.

Meanwhile the operable lower cutting edge 9u is located at the position closer to the rotary center than the operable upper cutting edge 7u, and functions as the center edge. In the state where the cutting insert 100 is mounted on the inner insert mounting seat 77, the operable second cutting edge 9u extends substantially in the radial direction with respect to the tool center axis O. The corner cutting edge portion 9b formed at the obtuse-angled corner portion 35 is positioned to protrude toward the leading end side of the tool. Therefore, the operable lower cutting edge 9u bites the workpiece in the improved way.

The depressed portion 23 is provided along the cutting edge portions 7c and 7d of the operable upper cutting edge 7u as the peripheral edge, which are located at the radial outer side. Meanwhile, the chip breaker groove 19 extends along the other part of the operable cutting edge 7u. As a result, the rake angle of the operable cutting edge 7u is no longer constant. Specifically, the relatively small rake angle, that is, relatively small rake angle at the positive side is formed by the inclined surface 19a of the chip breaker groove 19 with respect to the cutting edge portions 7a, 7b at the radial inner side which is the portion not having the depressed portion 23, of the operable cutting edge 7u. Meanwhile, the downward inclined surface 23a of the depressed portion 23 gives a relatively large rake angle, that is, relatively large rake angle at the positive side to the cutting edge portions 7c, 7d of the operable cutting edge 7u, which are located at the radial outer side. In this way, the depressed portion 23 gives the cutting edge portions 7c, 7d at the radial outer side the larger rake angle at the positive side than the rake angle at the portions 7a, 7b not having the depressed portion 23, of the operable cutting edge 7u. The higher the tool rotating speed becomes at the outer circumferential side, the greater the rake angle is given to the operable cutting edge 7 at the positive side. Therefore, in cutting with the operable cutting edge 7u, the thin chip is likely to be generated at the radial outer side part compared with the radial inner side part, which is likely to be curled.

Each of the rising wall surface 19c of the chip breaker groove 19 and the rising wall surface 23c of the depressed portion 23 functions as the chip breaker wall surface with respect to the operable cutting edge 7u, respectively. The right-angle length and depth of the depressed portion 23 are greater than those of the chip breaker groove 19. Therefore, at the radial outer side part of the operable cutting edge 7u, the time taken for the generated chip to collide with the chip breaker wall surface becomes long compared with the radial inner side part. Correspondingly, the radius of the curled portion of the chip is likely to be enlarged.

The radius of the curled portion of the chip is positively made different between the radial inner side part and the radial outer side part of the single operable cutting edge 7u, which impairs the shape balance of the chip to allow the chip to spirally extend continuously. This may cause the chip to be easily broken, thus suppressing generation of the long chip.

The depressed portion 43 is provided along the cutting edge portion 9c of the operable lower cutting edge 9u as the center edge, which is located at the radial outer side, and the chip breaker groove 39 extends along the other part. Therefore, it is possible to enhance the chip discharge performance as described above.

Particularly the chip discharging function can be effectively performed in the work for cutting the material with relatively high ductility, for example, the mild steel, stainless steel and the like. Accordingly, the cutting insert 100 and the drill 71 to which the cutting insert is mounted are suitable for the working of the material with high ductility.

Figure 15:
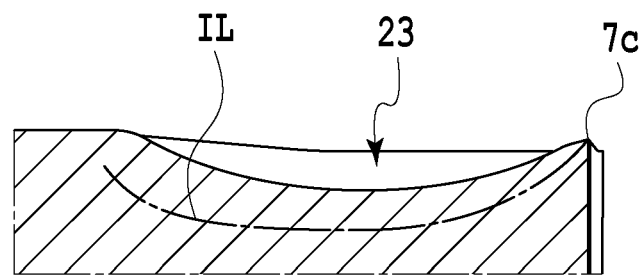
FIG. 15 is an explanatory view of a modified example of the cutting insert shown in FIG. 1.

The depressed portion may be formed to have its depth increasing and its right-angle length increasing from the side close to the center portion of the related cutting edge toward the end portion (outer portion), for the purpose of improving the aforementioned function. FIG. 15 schematically shows the modification of the depressed portion 23 of the cutting insert 100. FIG. 15 is a view corresponding to the upper part shown in FIG. 7. The dotted line IL of FIG. 15 represents the cross section shape of the depressed portion 23 at the position closer to the first corner cutting edge portion 7d than the line VII-VII in FIG. 3. The depressed portion may be formed to have at least one of the depth and the right-angle length increasing from the side closer to the center portion of the related cutting edge toward the end portion (outer portion).

The depressed portions 23, 43 can be provided in the upper and lower surfaces of the cutting insert 100, respectively without seriously reducing the raised portions 21, 41 on the upper and lower surfaces. Therefore, the depressed portion can be provided to enhance the chip discharging performance without deteriorating the seating stability at the insert mounting seat of the cutting insert 100.

The depressed portions 23, 43 further include the rising wall surfaces 23c, 43c, respectively. Formation of the large rake angle makes it possible to prevent the chip from damaging the screw 79 and the upper and lower surfaces 1 and 3.

The cutting insert 100 is of double-sided type having the upper surface only with the peripheral edges, and the lower surface only with the center edges so that both surfaces are usable. This makes it possible to design the depressed portions 23, 43 into suitable size and shape, respectively. Assuming that the cutting insert is of conventional type using only the single surface having the peripheral edge and the center edge formed on an edge part of the upper surface next to each other, if the depressed portion appropriately shaped for the peripheral edge is formed, a part of the depressed portion cannot avoid in getting into the operating region of the center edge. This may, to no small extent, influence the cutting operation with the center edge. Likewise, the depressed portion for the center edge may influence the cutting operation with the peripheral edge. However, since the cutting insert 100 has the peripheral edges and the center edges separately formed on the opposite surfaces, the aforementioned problem thus will not occur.

The present invention has been described in reference to the embodiment and its modified example. It is to be understood that any other modifications may also be applied in the present invention.

The cutting insert 100 includes three cutting edges on the respective end surfaces. However, the number of the cutting edges on the end surface may be one or more. It is also possible to form only one cutting edge on the cutting insert. In any of those cases, the depressed portion may be formed along at least a part of the cutting edge so as to effectuate the above-described operations and effects. The number of insert mounting seats for the entire tool body may be set to the arbitrary value. It is possible to provide a plurality of insert mounting seats of the same type.

Figure 16:
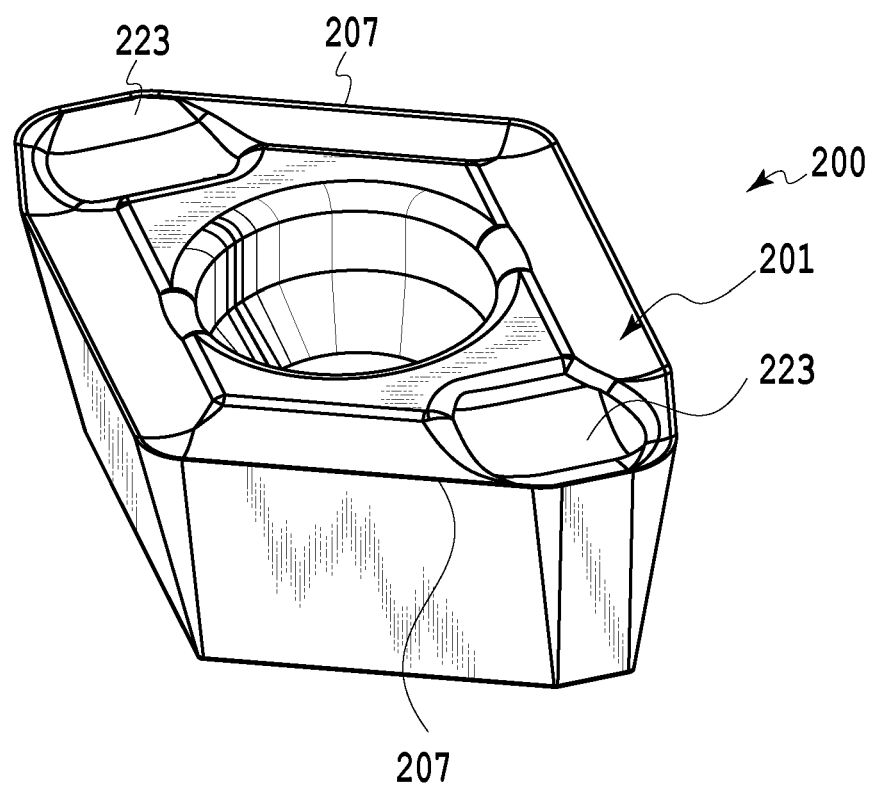
FIG. 16 is a perspective view of a cutting insert according to another embodiment of the present invention.
Figure 17:
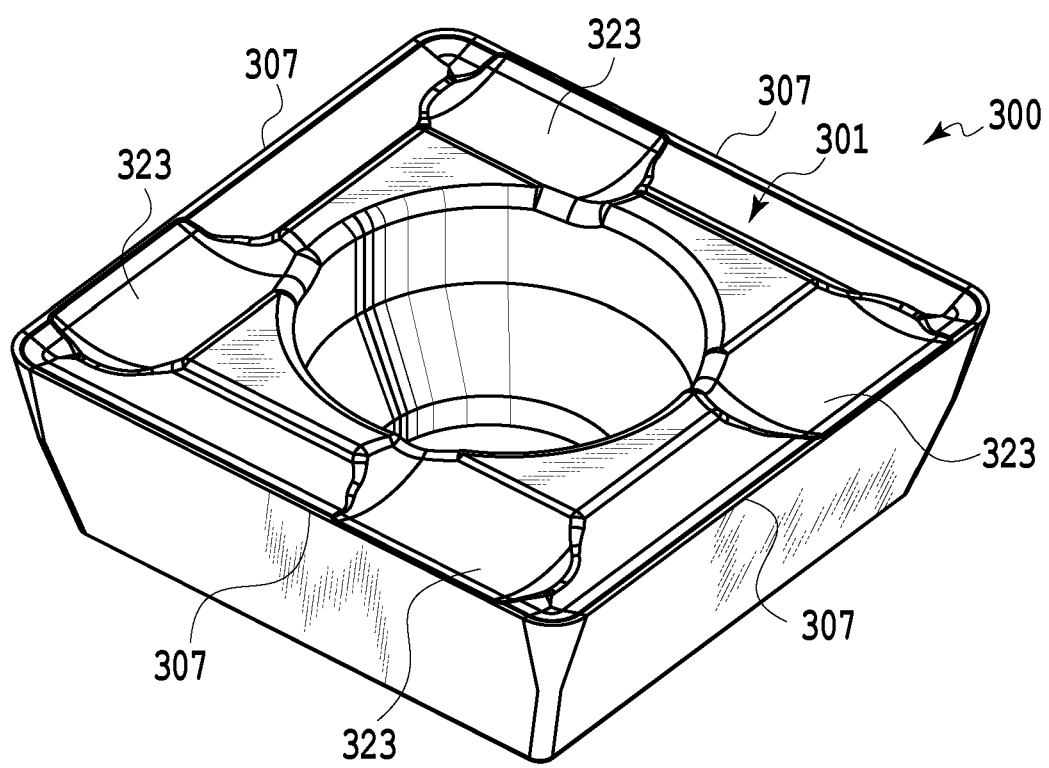
FIG. 17 is a perspective view of a cutting insert according to still another embodiment of the present invention.

Furthermore, the cutting insert is not limited to be of negative type, which may be set to be of positive type. The outline of the cutting insert may be formed into a substantially polygon other than the substantially triangular when seen from the side opposite to one end surface. For example, a cutting insert 200 shown in FIG. 16 and a cutting insert 300 shown in FIG. 17 are illustrated. The cutting insert 200 is of positive type used in the rotary cutting tool. An upper surface 201 of the cutting insert 200 has the substantially rectangular outline shape when seen from the side opposite to the upper surface 201. The upper surface 201 as the first end surface has two cutting edges 207 and two depressed portions 223. The depressed portion 223 is formed along the part at one end side of the cutting edge 207. A cutting insert 300 is of positive type, the upper surface 301 of which has a substantially square outline shape. The cutting insert 300 has four cutting edges 307 and four depressed portions 323 formed in the upper surface 301 as the first end surface. The depressed portion 323 is formed along the part at one end side of the cutting edge 307.

The depressed portion does not have to be formed into a substantially square shape. For example, the depressed portion may be formed into an arbitrary shape such as trapezoidal, parallelogram, and circular shape. The number of the depressed portions provided with respect to the single cutting edge may be set to not only one but also two or more. It is also possible to form the deeper and longer depressed portion so as to form the larger positive rake angle at a part of the cutting edge as the part of the cutting edge becomes closer to the outer circumferential side. For example, preferably, the depth of the depressed portion is set to be in a range of not less than 1.2 times and not more than 1.5 times the chip breaker groove depth in view of the chip processing performance.

It is also possible to provide both or at least any one of the upper and lower surfaces with at least one identification mark. This makes it possible to easily identify the used cutting edge and/or easily recognize the usage order of the cutting edge.

The present invention has been described concretely to a certain degree, using the aforementioned embodiments and its modified examples. However, the present invention is not limited to those examples. The present invention has to be recognized to allow various modifications and changes without departing from the scope or spirit of the present invention of the claims. That is, the present invention contains all possible modified examples, applications and equivalents involved in the concept of the present invention specified by the claims.

The invention claimed is:

1. A cutting insert comprising two opposite end surfaces and a circumferential side surface extending between the two end surfaces, comprising:
   a first cutting edge formed on an intersecting ridge portion between a first end surface of the two end surfaces and the circumferential side surface, the first cutting edge including a long cutting edge portion extending along a long side of the first end surface, a short cutting edge portion extending along a short side of the first end surface, a second corner cutting edge portion connecting the long cutting edge portion and one end of the short cutting edge portion, and a first corner cutting edge portion being formed at the other end of the short cutting edge portion; and a first depressed portion formed in the first end surface, the first depressed portion being formed along the short cutting edge portion of the first cutting edge so as to form a first rake angle at the first cutting edge which is larger than a second rake angle at an entirety of the long cutting edge portion not having the first depressed portion.

2. The cutting insert according to claim 1, wherein:
a first groove portion is formed in the first end surface;
the first groove portion extends along the long cutting edge portion and is connected to the first depressed portion;
the second rake angle at the first groove portion is smaller than the first rake angle at the first depressed portion; and
a length of the first groove portion in a direction orthogonal to the first cutting edge is shorter than a length of the first depressed portion in the direction orthogonal to the first cutting edge.

3. The cutting insert according to claim 1, wherein:
the cutting insert is formed for seating in a rotary tool having a tool rotation axis and a rotation direction with the first end surface facing the rotation direction; and
the first depressed portion is located at a radially outward part of the first cutting edge when the first cutting edge is disposed so as to extend substantially in a radial direction with respect to the tool rotation axis.

4. The cutting insert according to claim 1, wherein the first depressed portion is formed so that at least one of a depth of the first depressed portion and a length thereof in the direction orthogonal to the first cutting edge increases as it approaches the one end of the first cutting edge.

5. The cutting insert according to claim 1, wherein:
a plurality of the first cutting edges are formed on the intersecting ridge portion between the first end surface and the circumferential side surface; and
the plurality of first cutting edges extend rotationally symmetrically around an insert rotation axis extending so as to pass through the two end surfaces.

6. The cutting insert according to claim 5, further comprising:
a plurality of second cutting edges formed on the intersecting ridge portion between the second end surface of the two end surfaces and the circumferential side surface, the plurality of second cutting edges extending rotationally symmetrically around the insert rotation axis; and
a plurality of second depressed portions formed in the second end surface, each of the second depressed portions being formed along a short cutting edge portion at one end side of the related second cutting edge and provided so as to form a third rake angle at the second cutting edge which is larger than a fourth rake angle at a long cutting edge portion not having the second depressed portion of the second cutting edge.

7. The cutting insert according to claim 6, wherein:
a plurality of second groove portions are formed in the second end surface;
each of the second groove portions extends along the long cutting edge portion and is connected to a corresponding one of the second depressed portions;

the fourth rake angle at the second groove portion is smaller the third rake angle at the second depressed portion; and
a length of the second groove portion in a direction orthogonal to the second cutting edge is shorter than a length of the second recess portion in the direction orthogonal to the second cutting edge.

8. The cutting insert according to claim 6, wherein:
the cutting insert is formed for seating in a rotary tool having a tool rotation axis and a rotation direction with the second end surface facing the rotation direction; and
the second depressed portion is located at a radially outward part of the second cutting edge when the second cutting edge is disposed so as to extend substantially in a radial direction with respect to the tool rotation axis.

9. The cutting insert according to claim 6, wherein the second depressed portion is formed so that at least one of a depth of the second depressed portion and a length thereof in the direction orthogonal to the second cutting edge increases as it approaches the one end of the second cutting edge.

10. The cutting insert according claim 6, wherein the first cutting edge is configured to have a different shape from that of the second cutting edge.

11. A cutting edge replaceable rotary cutting tool comprising:
a tool body having a tool rotation axis, a rotation direction and at least one first insert mounting seat; and
a first cutting insert detachably mounted on the at least one first insert mounting seat, wherein:
the first cutting insert is a cutting insert according to claim 1,
the cutting insert is mounted on the at least one first insert mounting seat so that an operable first cutting edge extends substantially in a radial direction with respect to the tool rotation axis; and
the first depressed portion associated with the operable first cutting edge is located at a radially outward part of the operable first cutting edge.

12. The cutting tool according to claim 11, wherein:
the tool body further comprises at least one second insert mounting seat;
in the cutting insert:
an insert rotation axis extends so as to pass through the two end surfaces;
a plurality of the first cutting edges are formed on the intersecting ridge portion between the first end surface and the circumferential side surface, and the plurality of first cutting edges extends rotationally symmetrically around the insert rotation axis;
a plurality of second cutting edges are formed on the intersecting ridge portion between the second end surface of the two end surfaces and the circumferential side surface, the plurality of second cutting edges extending rotationally symmetrically around the insert rotation axis; and
a plurality of second depressed portions are formed in the second end surface, each of the second depressed portions being formed along a short cutting edge portion at one end side of the related second cutting edge and provided so as to form a third rake angle at the second cutting edge which is larger than a fourth rake angle at a long cutting edge portion not having the second depressed portion of the second cutting edge;

a second cutting insert is mounted on the at least one second insert mounting seat so that an operable second cutting edge extends substantially in a radial direction with respect to the tool rotation axis; and the second depressed portion associated with the operable second cutting edge is located at a radially outward part of the operable second cutting edge.

13. A cutting insert comprising opposite first and second end surfaces; a circumferential side surface extending between the first and second end surfaces; and an insert rotation axis passing through the first and second end surfaces, the cutting insert further comprising:

a plurality of first cutting edges formed at the intersection of the first end surface and the circumferential side surface, the first cutting edges being rotationally symmetric around the insert rotation axis;

a plurality of second cutting edges formed at the intersection of the second end surface and the circumferential side surface, the second cutting edges being rotationally symmetric around the insert rotation axis;

each first cutting edge comprising a long cutting edge portion extending along a long side of the first end surface, a short cutting edge portion extending along a short side of the first end surface, a second corner cutting edge portion connecting the long cutting edge portion and one end of the short cutting edge portion, and a first corner cutting edge portion being formed at the other end of the short cutting edge portion, the short cutting edge portion having an associated first depressed portion formed in the first end surface, the first depressed portion having a first rake angle which is larger than a second rake angle at an entirety of any other first cutting edge portion not having the first depressed portion belonging to said each first cutting edge;

each second edge comprising a plurality of second cutting edge portions, an end second cutting edge portion having an associated second depressed portion formed in the second end surface, the second depressed portion having a third rake angle which is larger than a fourth rake angle at any other second cutting edge portion belonging to said each second cutting edge; wherein:

the first end surface has a different shape from the second end surface; and the first cutting edges have a different shape from the second cutting edges.

14. The cutting insert according to claim 13, wherein:

each first cutting edge comprises a long cutting edge portion connected to a short cutting edge portion via a corner cutting edge portion;

the first depressed portion is associated with the short cutting edge portion of said each first cutting edge;

each second cutting edge comprises a short cutting edge portion connected to a long cutting edge portion via a corner cutting edge portion;

the second depressed portion is associated with the long cutting edge portion of said each second cutting edge.

15. A cutting edge replaceable rotary cutting tool, comprising:

a tool body having a tool rotation axis, a rotation direction and first and second insert mounting seats; and a first cutting insert in accordance with claim 13 detachably mounted on the first insert mounting seat with one of said plurality of first cutting edges being operable and extending substantially in a radial direction with respect to the tool rotation axis;

a second cutting insert in accordance with claim 13 detachably mounted on the second insert mounting seat with one of said plurality of second cutting edges being operable and extending substantially in a radial direction with respect to the tool rotation axis.

16. The cutting edge replaceable rotary cutting tool according to claim 15, wherein:

the first depressed portion associated with the operable first cutting edge is located at a radially outward part of the operable first cutting edge, with respect to the tool rotation axis; and the second depressed portion associated with the operable second cutting edge is located at a radially outward part of the operable second cutting edge, with respect to the tool rotation axis.

17. A cutting insert comprising opposite first and second end surfaces, a circumferential side surface extending between the first and second end surfaces; and an insert rotation axis passing through the first and second end surfaces, the cutting insert further comprising:

a plurality of first cutting edges formed at the intersection of the first end surface and the circumferential side surface, the first cutting edges being rotationally symmetric around the insert rotation axis;

a plurality of second cutting edges formed at the intersection of the second end surface and the circumferential side surface, the second cutting edges being rotationally symmetric around the insert rotation axis;

each first cutting edge including a long cutting edge portion extending along a long side of the first end surface, a short cutting edge portion extending along a short side of the first end surface, a second corner cutting edge portion connecting the long cutting edge portion and one end of the short cutting edge portion, and a first corner cutting edge portion being formed at the other end of the short cutting edge portion;

a first depressed portion formed in the first end surface, along the short cutting edge portion, the first depressed portion having a first right-angle length $L1$ taken in a direction orthogonal to the first cutting edge, and forming a first rake angle at the first cutting edge; and a first chip breaker groove formed in the first end surface, along an entirety of the long cutting edge portion not having the first depressed portion, the first chip breaker groove having a second right-angle length $L2$ taken in a direction orthogonal to the first cutting edge, and forming a second rake angle at the first cutting edge; wherein:

the first cutting edges have 120° rotational symmetry around the insert rotation axis;

the second cutting edges have 120° rotational symmetry around the insert rotation axis;

the first right-angle length $L1$ is longer that the second right-angle length $L2$;

the first end surface has a different shape from the second end surface; and the first rake angle is larger than the second rake angle.

18. The cutting insert according to claim 17, wherein:

a depth of the first depressed portion is between 1.2 to 1.5 times a depth of the first chip breaker groove.

* * * * *